(12) United States Patent
Kommera et al.

(10) Patent No.: US 11,762,862 B2
(45) Date of Patent: *Sep. 19, 2023

(54) REAL-TIME PROCESSING OF EVENT BASED STREAMING WITH NOSQL DATABASES

(71) Applicant: CAPITAL ONE SERVICES, LLC, McLean, VA (US)

(72) Inventors: Raveender Kommera, Flower Mound, TX (US); Nathan E. Gloier, Frisco, TX (US); Rajesh Sathraboina, Irving, TX (US); Vairavelu Sathish Kumaran, McKinney, TX (US); Venu Meda, Little Elm, TX (US); Jingjie Zhao, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,809

(22) Filed: May 3, 2022

(65) Prior Publication Data

US 2022/0261404 A1    Aug. 18, 2022

Related U.S. Application Data

(63) Continuation of application No. 16/577,678, filed on Sep. 20, 2019, now Pat. No. 11,347,745, which is a
(Continued)

(51) Int. Cl.
*G06F 7/00* (2006.01)
*G06F 16/2455* (2019.01)
(Continued)

(52) U.S. Cl.
CPC ........ *G06F 16/24568* (2019.01); *G06F 9/546* (2013.01); *G06F 16/23* (2019.01); *G06F 16/258* (2019.01); *G06F 16/284* (2019.01)

(58) Field of Classification Search
CPC .. G06F 16/24568; G06F 16/23; G06F 16/284; G06F 16/258; G06F 16/2228;
(Continued)

(56) References Cited

U.S. PATENT DOCUMENTS

| | | |
|---|---|---|
| 9,690,820 B1 | 6/2017 | Girulat, Jr. |
| 9,756,119 B2 | 9/2017 | Pareek et al. |
| 9,852,220 B1 | 12/2017 | Guo et al. |
| 10,331,657 B1 | 6/2019 | Cole et al. |

(Continued)

*Primary Examiner* — Mohammad A Sana
(74) *Attorney, Agent, or Firm* — Perkins Coie LLP

(57) ABSTRACT

Systems, methods, and media for real-time processing of event-based streaming with NoSQL databases are provided. For example, disclosed embodiments may include receiving an event associated with an update to an entry in a first database. Also, disclose embodiments may include identifying, based on the event, relevant data in the first database associated with the update. Further, disclose embodiments may include generating a plurality of queries to the first database to request the identified relevant data. Disclose embodiments may also include receiving, in response to the plurality of queries, raw data from the first database. Additionally, disclose embodiments may include processing the raw data to be compatible with a second database. Disclose embodiments may also include storing the processed raw data in the second database. And, disclosed embodiments may include receiving data requests for the second database to distribute the processed data to at least one computer terminal.

20 Claims, 7 Drawing Sheets

Related U.S. Application Data continuation of application No. 16/204,128, filed on Nov. 29, 2018, now Pat. No. 10,445,322.

(51) Int. Cl.
| | |
|---|---|
| *G06F 16/25* | (2019.01) |
| *G06F 9/54* | (2006.01) |
| *G06F 16/23* | (2019.01) |
| *G06F 16/28* | (2019.01) |

(58) Field of Classification Search
CPC .... G06F 9/546; G06F 9/44521; G06F 9/5038; G06F 9/5033; G06F 9/542
See application file for complete search history.

(56) References Cited

U.S. PATENT DOCUMENTS

| | | | |
|---|---|---|---|
| 10,506,392 B1* | 12/2019 | Amireddy | H04L 47/822 |
| 10,673,779 B1 | 6/2020 | Mehr | |
| 11,347,745 B2* | 5/2022 | Kommera | G06F 16/24568 |
| 2004/0148283 A1 | 7/2004 | Harris et al. | |
| 2009/0088254 A1* | 4/2009 | Courage | A63F 13/795 |
| | | | 463/43 |
| 2013/0097259 A1 | 4/2013 | Li et al. | |
| 2014/0143126 A1 | 5/2014 | Malik | |
| 2017/0262508 A1 | 9/2017 | Garcia | |
| 2018/0067932 A1 | 3/2018 | Paterson et al. | |
| 2018/0089328 A1 | 3/2018 | Bath et al. | |
| 2018/0330380 A1 | 11/2018 | Sundaram | |
| 2020/0067861 A1 | 2/2020 | Leddy et al. | |
| 2020/0073978 A1 | 3/2020 | Dain et al. | |
| 2021/0021503 A1* | 1/2021 | Kfir | H04L 43/062 |

* cited by examiner

REAL-TIME PROCESSING OF EVENT BASED STREAMING WITH NOSQL DATABASES

CROSS-REFERENCE TO RELATED APPLICATIONS

This application is a continuation of U.S. patent application Ser. No. 16/577,678, filed Sep. 20, 2019, which is a continuation of U.S. patent application Ser. No. 16/204,128, filed Nov. 29, 2018. The contents of these applications are hereby expressly incorporated herein in their entirety.

TECHNICAL FIELD

The disclosed embodiments generally relate to databases, and more particularly, relate to real-time processing for event-based streamlining of NoSQL databases.

BACKGROUND

To organize and store collections of data, computing systems may employ digitized databases. Relational databases, which are digital databases based on a relational model, serve as one type of database. These types of databases may utilize a model to organize data into one or more tables, which have columns and rows, with a unique key identifying each row. Each row may serve as a record, while the columns may define particular attributes of each record. For example, a table may store information on individuals, such as a first name, last name, age, and favorite color. In such an example, the first name, last name, age, and favorite color would each form a separate column. An entry recording such information for a given individual would make up each row in the table. For example, a row may include "Caroline," "O'Nell," "27," and "cerulean," respectively. One can add additional columns to define more attributes for Caroline O'Nell, such as a shoe size and hair color. To work with data in relational databases like the one in this example, a computer terminal may transmit a query to access data or send an update to add new entries or edit existing entries. These types of message may be sent to a relational database using Structured Query Language (SQL). SQL may include commands for data query, data manipulation, data definition (e.g., defining or updating columns in a relational database table), and data access control.

Separate from relational databases, other types of computer data storage exists which may not require the strict table format of a relational database. Certain computer systems use nonrelational or "NoSQL" databases, for example, include data structures that can be viewed as being more flexible than relational database tables. Instead of using a tabular format like relational databases, NoSQL databases may employ data models including column data models, document data models, key-value data models, and graph data models. Each of these data models offer different level of performance, scalability, flexibility, complexity, and functionality. Further, most NoSQL databases do not include the functionality of having joins in queries, which does not permit one-to-one compatibility with relational databases.

SUMMARY

The disclosed embodiments address disadvantages of existing systems by providing novel systems, methods, and techniques for real-time processing of event-based streaming from databases. The disclosed systems and methods may prevent the negative effects caused by legacy and/or current databases that used, for example, relational databases such as SQL. The disclosed embodiments are unlike any prior implementations and provide multiple ways, as described below, to real-time processing of event-based streaming with databases, such as NoSQL databases.

Systems, methods, and media for real-time processing of event-based streaming with NoSQL databases are provided. For example, disclosed embodiments may include receiving an event associated with an update to an entry in a first database. Also, disclose embodiments may include identifying, based on the event, relevant data in the first database associated with the update. Further, disclose embodiments may include generating a plurality of queries to the first database to request the identified relevant data. Disclose embodiments may also include receiving, in response to the plurality of queries, raw data from the first database. Additionally, disclose embodiments may include processing the raw data to be compatible with a second database. Disclose embodiments may also include storing the processed raw data in the second database. And, disclosed embodiments may include receiving data requests for the second database to distribute the processed data to at least one computer terminal.

This disclosure also provides for systems, methods, and media for real-time processing of event-based streaming with NoSQL databases that may include receiving an event associated with an update to an entry in a relational database. For example, disclosed embodiments may also include identifying, based on the event, relevant data in the relational database associated with the update. Further, disclosed embodiments may include generating a plurality of queries to the relational database to request the identified relevant data. Disclosed embodiments may additionally include receiving, in response to the plurality of queries, data from the relational database. Disclosed embodiments may include updating nonrelational data in a nonrelational database based on the received data. Disclosed embodiments may further include processing data requests for the nonrelational database to distribute the updated nonrelational data to at least one computer terminal.

This disclosure further provides for systems, methods and media for controlling real-time processing of event-based streaming with NoSQL databases. For example, disclosed embodiments may include receiving, from a plurality of computing devices, status information. The status information may be associated with a relational database update corresponding to an event, a queue that stores the event, an application programming interface (API) that provides, from a nonrelational database, data associated with the event, or a combination of any of the three. Also, disclosed embodiments may include comparing each of the relational database update status information, the queue status information, and the API status information to corresponding thresholds. And, disclosed embodiments may include generating, based on the comparing, a notification and control instructions.

This disclosure provides for additional systems, methods and media for controlling real-time processing of event-based streaming with NoSQL databases. For example, disclosed embodiments may include receiving, from a plurality of computing devices, status information. The status information may be associated with a relational database update corresponding to an event, and an application programming interface (API) that provides, from a nonrelational database, data associated with the event. Disclosed embodiments may additionally include comparing each of the relational database update status information, and the API status information to corresponding thresholds. And, disclosed embodiments may include controlling, based on the comparing, processing resources. The processing resources may be associated with one or more of: the API a relational database associated with the relational database update, the nonrelational database, and a server that processes concurrent calls to the API.

Aspects of the disclosed embodiments may also include a method or a non-transitory tangible computer-readable medium that stores software instructions that, when executed by one or more processors, are configured for and capable of performing and executing one or more of the instructions, methods, operations, and the like, consistent with the disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
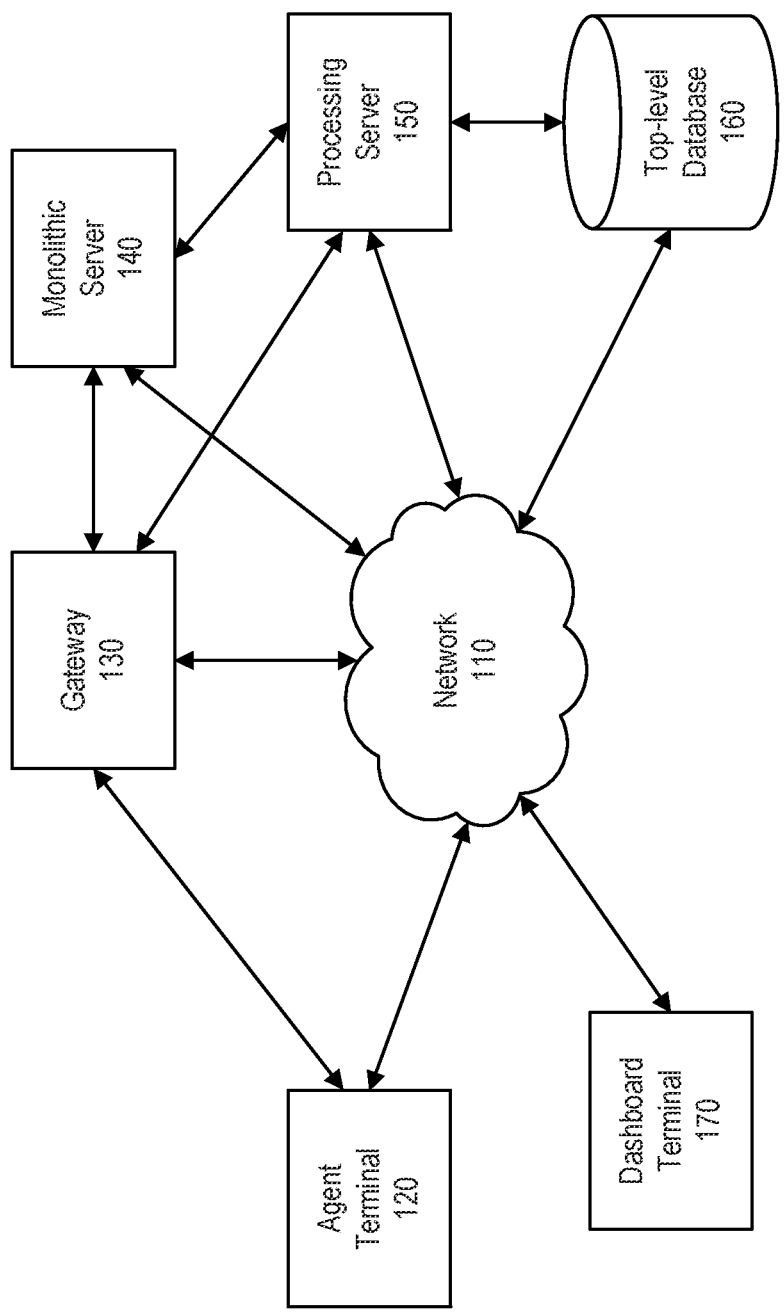
FIG. 1 is a block diagram of an exemplary computing system, consistent with disclosed embodiments.

The disclosed embodiments generally relate to databases, and more particularly, relate to real-time processing for event based streamlining NoSQL databases. The following detailed description refers to the accompanying drawings. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims. Reference will now be made in detail to the disclosed embodiments, examples of which are illustrated in the accompanying drawings. Wherever convenient, the same reference numbers will be used throughout the drawings to refer to the same or like parts.

Disclosed embodiments may relate to systems, methods, and media that allow two different types of databases to be used together. In some embodiments, systems may include a first legacy database, such as one that has been historically used to capture, organize, store, and retrieve data associated with a particular application. For example, embodiments may use a monolithic server that may include a relational database (e.g., SQL database). The monolithic database may serve as a global repository for application information or user profile data, for example. However, such a monolithic, relational database may result in slow query processing. For example, retrieving updated data from the monolithic, relational database may require "batch" processing. That is, updated data from the database may be received in groups, with updates to separate entries bundled together. The monolithic, relational database may also require frequent hardware upgrades to maintain adequate processing speeds. For example, as the numbers of data entries, storage size of each entry, and complexity of the data model increases over time, existing hardware may process data requests too slowly to properly support requirements of font end processes.

Embodiments may include a second database that functions alongside the legacy database. The second database may serve as a "top-level" or "front-end" database that facilitates swifter data access to front-end applications. In some embodiments, the second database may be a database of a different type that the first database. For example, the first database may be a relational database, and the second database may be a nonrelational database. The relational database may be, for example, a SQL database, while the nonrelational database may be a NoSQL database, such as an Apache Cassandra database. An Apache Cassandra database may serve as one example free and open-source, distributed, wide column store, NoSQL database management system used in certain embodiments. However, other types of databases, such as wide column store databases, distributed databases, free, and/or open-source databases may be used consistent with disclosed embodiments.

The second database may also differ from the first database in the way it stores data. For example, the first database may store data with a particular primary "view" or application that differs from the second database. While the first database may store entries for each user in a system, such as a user profile that is used across multiple applications, the second database may store the same user profile data but organized in a data model that is structured to orient the data by individual applications. The user profiles may include preferences for individual applications as well as global preferences. The second database in this example would store the same data but on a per-application basis. This may allow a given application to identify relevant user profiles that may need to be accessed, along with applicable application-specific and global user preferences. As another example, the first database may be a database of mortgage applications, with application details stored and keyed to a unique identifier for each application—making it a database with a mortgage application view of the data. In this example, the second database may store data based on loan officers responsible for processing the mortgage applications in the first database. A loan officer may be responsible for process of multiple applications. While the first database includes the details and status indicators for each individual application, the second database may organize the data to first filter it by loan officer, so that the loan officer can quickly identify each loan they are responsible for processing, its status, and any action items the officer needs to perform for a given loan. Additional example data implementations may be used consistent with the disclosed embodiments.

In certain embodiments, the two databases—the monolithic database and the top-level database—may form a hierarchy of data storage to provide highly-requested data, likely-to-be-requested data, and/or current data to front-end applications. For example, disclosed embodiments may flag updates to the monolithic database that may need to be timely accessed by front-end applications. Disclosed embodiments may create queries to the monolithic database to receive, process, and/or store the data in the second database. Front-end applications may then receive data from the top-level, second database.

Disclosed embodiments may include additional technical benefits. In some embodiments, the use of the monolithic database with top-level database may allow upgraded database performance to a legacy monolithic database without having significant downtime in the monolithic database. Further, the addition of the top-level database to systems using a monolithic database may allow the resulting system to implement functionality that was not possible with a monolithic server by itself. For example, a legacy monolithic database may be constrained to providing data in scheduled "batches," rather than providing realtime updates through an API resource facilitated by microservices. As another example, the legacy monolithic database may have reduced flexibility in how the data is stored. For example, the legacy monolithic database may be a relational (e.g., SQL) database with a fixed tabular format. The addition of the top-level database may include a flexible schema that can add or manipulate fields in operations that were not possible or too resource intensive in a legacy fixed tabular format. Additionally, the use of a monolithic server combined with a top-level database may form a system that provides data redundancy, preventing data loss in the event of a catastrophic failure of one or the two databases.

In still another example benefit, disclosed embodiments may allow a system to retire or phase out the use of a legacy database (e.g., the monolithic database) gradually over time. For example, the top-level database of disclosed embodiments may improve and/or replace certain functionality of a legacy database incrementally. Without the incremental upgrades provided by disclosed embodiments, one may face the alternative of providing a replacement to a legacy monolithic database in its entirety at once. Such an alternative may include undesirable system downtime and significant costs, whereas disclosed embodiments may upgrade individual functions of a legacy system while maintain continued operation.

FIG. 1 is a block diagram of an exemplary computing system 100. The components and arrangements shown in FIG. 1 are not intended to limit the disclosed embodiments, as the components used to implement the disclosed processes and features may vary. In particular, computing system 100, as presented, may include components to demonstrate the functionality of one or more pre-existing monolithic server systems. In accordance with disclosed embodiments, computing system 100 may include network 110, which may be connected to one or more of agent terminal 120, gateway 130, monolithic server 140, processing server 150, top-level database 160, and dashboard terminal 170. While only a single iteration of each device is depicted in FIG. 1, system 100 may include one or more of each of the shown components. Other components known to one of ordinary skill in the art may be included in system 100 to gather, process, transmit, receive, and provide information used in conjunction with the disclosed embodiments.

The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

Network 110 may comprise any computer networking arrangement used to exchange data. For example, Network 110 may be the Internet, a private data network, a virtual private network (VPN) using a public network, and/or other suitable connections that enable the components of FIG. 1 to send and acquire information. Network 110 may also include a public switched telephone network ("PSTN") and/or a wireless network such as a cellular network, Wi-Fi network, and/or another known wireless network (e.g., WiMAX) capable of bidirectional data transmission. Network 110 may also be a wide area network (i.e., a WAN).

Network 110 may also include one or more local networks (not pictured). A local network may be used to connect the components of FIG. 1 to network 110. A local network may comprise any type of computer networking arrangement used to exchange data in a localized area, such as Wi-Fi based on IEEE 802.11 standards, Bluetooth™, Ethernet, and other suitable network protocols that enable components of system 100 to interact with one another and to connect to network 110 for interacting with components of FIG. 1. In some embodiments, a local network comprises a portion of network 110. In other embodiments, components of system 100 may communicate via network 110 without a separate local network.

Agent terminal 120 may comprise a memory, a processor, and/or other specialized hardware that is configured to execute one or more methods of the disclosed embodiments. Agent terminal 120 may be a desktop computer, laptop computer, tablet computer, artphone, or any other suitable device with computing capability. Computing system 200 shown in FIG. 2 may be an example agent terminal 120. Agent terminal 120 may have an application installed thereon, which may receive, process, store, and/or provide information. The application may include and/or execute one or more applications that request and/or receive information from one or more databases. Agent terminal 120 may also transmit data, including one or more applications, to and receive data from, via network 110, gateway 130, monolithic server 140, processing server 150, top-level database 160, and/or dashboard terminal 170. For example, agent terminal 120 may send updates to records stored in databases associated with monolithic server 140 and/or top-level database 160. A user may operate agent terminal 120 to perform one or more operations consistent with disclosed embodiments. In some embodiments, a user may operate agent terminal 120 to run applications that receive and transmit data to one or more databases or networked computing systems.

Monolithic server 140 may comprise a database capable of storing data. In some embodiments, monolithic server 140 may be a legacy database that has been historically used to capture, organize, store, and retrieve data associated with a particular application. For example, monolithic server 140 may include a relational database (e.g., SQL database), in other examples, monolithic server 140 may be other types of databases, such as a nonrelational database (e.g., a NoSQL database, a graph database, etc.). Monolithic server 140 may serve as a global repository for application information or user profile data, for example.

Monolithic server 140 may comprise a memory, a processor, and/or other specialized hardware that is configured to execute one or more methods of the disclosed embodiments. Monolithic server 140 may be a rack server, distributed computing system, desktop computer, laptop computer, tablet computer, smartphone, or any other suitable device with computing capability. For example, monolithic server 140 may be implemented as computing system 200 shown in FIG. 2.

Top-level database 160 may be a database capable of storing data. In some embodiments, top-level database 160 may serve as a "top-level" or "front-end" database that facilitates swifter data access to front-end applications. Top-level database 160 may be a nonrelational database, such as a NoSQL database. For example, top-level database 160 may include a column data model nonrelational database (e.g., Apache Cassandra™, HBase™, Vertica™), a document data model nonrelational database (e.g., Apache CouchDB™, MongoDB™, OrientDB™, Qizx™), key-value data model nonrelational database (e.g., Apache Ignite, Oracle NoSQL Database™, Redis™, InfinityDB™), and/or a graph data model nonrelational database (e.g., Apache Giraf™, InfiniteGraph™, DEX/Sparksee™). In some embodiments, top-level database 160 may be a database of a different type that the first database. For example, if monolithic server 140 includes a relational database, top-level database 160 may be a nonrelational database. Top-level database 160 may include computing processing resources capable of facilitating interactions with a database. For example, while referred to as a "database," top-level database 160 may include one or more a database management system, processor, memory, and other hardware and software to facilitate access to the data stored in its database.

In some embodiments, monolithic server 140 and top-level database 160 may differ in the way they store data. Monolithic server 140 may store data with a particular primary "view" or application that differs fro that of top-level database 160. For example, while monolithic server 140 may store entries for each user in a computer system, such as user profiles is used across multiple applications, top-level database 160 may store the same user profile data, or a subset of the user profiled data, but organized in a data model that is structured to orient the data by individual applications. The user profiles may include preferences for individual applications as well as global preferences. The second database in this example would store the same data but on a per-application basis. This may allow a given application to identify relevant user profiles that may need to be accessed, along with applicable application-specific and global user preferences. As another example, monolithic server 140 may be a database of mortgage applications, with application details stored and keyed to a unique identifier for each application—making it a database with a mortgage application view of the data. In this example, top-level database 160 may store data based on loan officers responsible for processing the mortgage applications in monolithic server 140. A loan officer may be responsible for process of multiple applications. While monolithic server 140 includes the details and status indicators for each individual application, top-level database 160 may organize the data to first filter it by loan officer, so that the loan officer can quickly identify each loan they are responsible for processing, its status, and any action items the officer needs to perform for a given loan. In still other examples, monolithic server 140 may be used to store data associated with online transactions or internet forums. In the example of online transactions, monolithic server 140 may store individual transactions, while top-level database may store transactional data for a given account. In the example of an online forum, monolithic server may store forum messages in separate threads, and top-level database 160 may store the messages organized according to the authoring user. Additional example data implementations may be used consistent with the disclosed embodiments.

Gateway 130 may be a computing system that facilitates interaction with monolithic server 140. Gateway 130 may comprise a memory, a processor, and/or other specialized hardware that is configured to execute one or more methods of the disclosed embodiments. Gateway 130 may be a rack server, distributed computing system, desktop computer, laptop computer, tablet computer, smartphone, or any other suitable device with computing capability. Computing system 200 shown in FIG. 2 may be an example gateway 130.

In some embodiments, gateway 130 may control updates to one or more databases. Gateway 130 may update data in one or more databases of monolithic server 140. Gateway 130 may receive data from agent terminal 120, network 110, and/or other computing devices to add information, edit existing data, or delete data from one or more databases of monolithic server 140. For example, gateway 130 may facilitate updates to a relational database of monolithic server 140, such as a SQL database.

In some embodiments, gateway 130 may log a history of the updates it makes. Gateway 130 may create an "event" that is a record of the change made in a database of monolithic server 140. For example, gateway 130 may create an event that notes the database entry that is updated (or added in the case of a new database entry) as well as the change made to the database entry at issue. For example, when updating a relational SQL database, gateway 130 may record the "insert," "delete," "update," or other SQL statement that changes the data entries in a database. In another example, gateway may store the entire row of a relational table that has been edited with the change annotated in mark-ups. Gateway 130 may provide events to other components of system 100. For example, gateway 130 may transmit updates to processing server 150.

Processing server 150 may be a computing system that facilitates interaction with monolithic server 140. Processing server 150 may comprise a memory, a processor, and/or other specialized hardware that is configured to execute one or more methods of the disclosed embodiments. Processing server 150 may be a rack server, distributed computing system, desktop computer, laptop computer, tablet computer, smartphone, or any other suitable device with computing capability. Computing system 200 shown in FIG. 2 may be an example processing server 150.

As shown in FIG. 1, processing server 150 may be connected to gateway 130. In some embodiments, processing server 150 may receive notifications from gateway 130 regarding updates made to one or more databases. For example, processing server 150 may receive one or more events from gateway 130 describing changes gateway 130 facilitated in one or more databases associated with monolithic server 140.

As shown in FIG. 1, processing server 150 may be disposed between monolithic server 140 and top-level database 160. Processing server 150 may act as an intermediary between monolithic server 140 and top-level database 160. In some embodiments, processing server 150 may pull data from monolithic server 140 and store it in top-level database 160. For example, processing server 150 may transmit one or more queries to monolithic server 140 to retrieve relevant data and store that data in top-level database 160. Processing server 150 may retrieve data based on information received from gateway 130. For example, processing server 150 may receive one or more events from gateway 130 and submit concurrent, multi-threaded queries to monolithic server 140 to retrieve data associated with the events. Processing server 150 may store the returned data in top-level database 160.

Processing server 150 may include resources to manipulate data. In some embodiments, processing server 150 may transform data received from monolithic server 140. In some embodiments, processing server 150 may transform a format of the data. Processing server 150 may receive relational data from monolithic server 140 and transform it to be suitable for storage in a nonrelational database. For example, processing server 150 may receive tabular SQL data and transform it into a JavaScript Object Notation (JSON) format that is compatible with a nonrelational NoSQL database. In some embodiments, processing server 150 may manipulate the view of the data. Processing server may receive tabular relational data keyed to a particular attribute in a tuple (or row) and reorient them to be aggregated based on a different attribute. For example, tabular relational data may be organized with tuples (or rows) for each user, where the tuples include attributes for multiple applications, in this example, processing server 150 may change the view to organize the data for each application, such as by including all user data relevant to a give application, rather than including attributes for multiple applications for an individual user. In another example, tabular data may include tuples (or rows) for loan applications. In this example, processing server 150 may reorient the data to be organized based on a load officer responsible for processing the loan. Processing server 150 may store the transformed and/or reoriented data in top-level database 160.

Dashboard terminal 170 may be a computing system that facilitates interaction with monolithic server 140. Dashboard terminal 170 may comprise a memory, a processor, and/or other specialized hardware that is configured to execute one or more methods of the disclosed embodiments. Dashboard terminal 170 may be a rack server, distributed computing system, desktop computer, laptop computer, tablet computer, smartphone, or any other suitable device with computing capability. Computing system 200 shown in FIG. 2 may be an example dashboard terminal 170.

In some embodiments, dashboard terminal 170 may receive status information from other system components. Dashboard terminal 170 may use this information to identify bottlenecks in system processing, automatically perform load balancing, and/or alert administrators to potential issues within the system. For example, dashboard terminal 170 may receive real-time updates from one or more of gateway 130, monolithic server 140, processing server 150, top-level database 160, and/or agent terminal 120. The real-time updates may include relevant metrics, such as queue length, response time, processing resource usage, memory resource usage, and the like. In some embodiments, dashboard terminal 170 may generate a graphical user interface (GUI). For example, dashboard terminal 170 may provide an alert to one or more administrators in a GUI responsive to determining that one or more thresholds are exceeded (e.g., queue length exceeding a predefined length, response time rising above a predefined response time limit, resource usage hitting a cap, and the like). Dashboard terminal 170 may also provide a graphical representation of the status information on the generated GUI, such as a line graph showing a time-wise series of values for numerical status information. Additional GUI designs may be generated by dashboard terminal 170 consistent with disclosed embodiments.

Each of gateway 130, monolithic server 140, processing server 150, and top-level database 160 may be located in a single location (e.g., a data center) or different physical locations. Multiple servers may be formed as a grid to share resources and workloads. Each of gateway 130, monolithic server 140, processing server 150, and top-level database 160 may include a plurality of linked nodes operating collaboratively to run various applications, software modules, analytical modules, rule engines, etc. Each node may be implemented using a variety of different equipment, such as a supercomputer, personal computer, a server, a mainframe, a mobile device, or the like. In some embodiments, the number of servers may be expanded or reduced based on workload. In some embodiments, one or more components of FIG. 1 (including gateway 130, monolithic server 140, processing server 150, and top-level database 160) may be placed behind a load balancer to support high availability and ensure real-time (or near real-time) processing of database updates. Although shown as separate components, in some embodiments one or more of agent terminal 120, gateway 130, monolithic server 140, processing server 150, top-level database 160, and/or dashboard terminal 170 may be combined so that the functionality is provided on a single computing platform. For example, processing server 150 may be combined with dashboard terminal 170 on a single computing platform that offers the processing functionality of processing server 150 described in this disclosure together with the status monitoring of dashboard terminal 170.

Gateway 130, monolithic server 140, processing server 150, and/or top-level database 160 may also be implemented using one or more cloud service(s) (not pictured). Cloud service may include a physical and/or virtual storage system associated with cloud storage for storing data and providing access to data via a public network such as the Internet. As used herein, cloud service refers to physical and virtual infrastructure associated with a single cloud storage service and may manage and/or store data associated with managing tip recommendations. Cloud service may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 110. In some embodiments, cloud service comprises multiple computer systems spanning multiple locations and having multiple databases or multiple geographic locations associated with a single or multiple cloud storage service(s).

Figure 2:
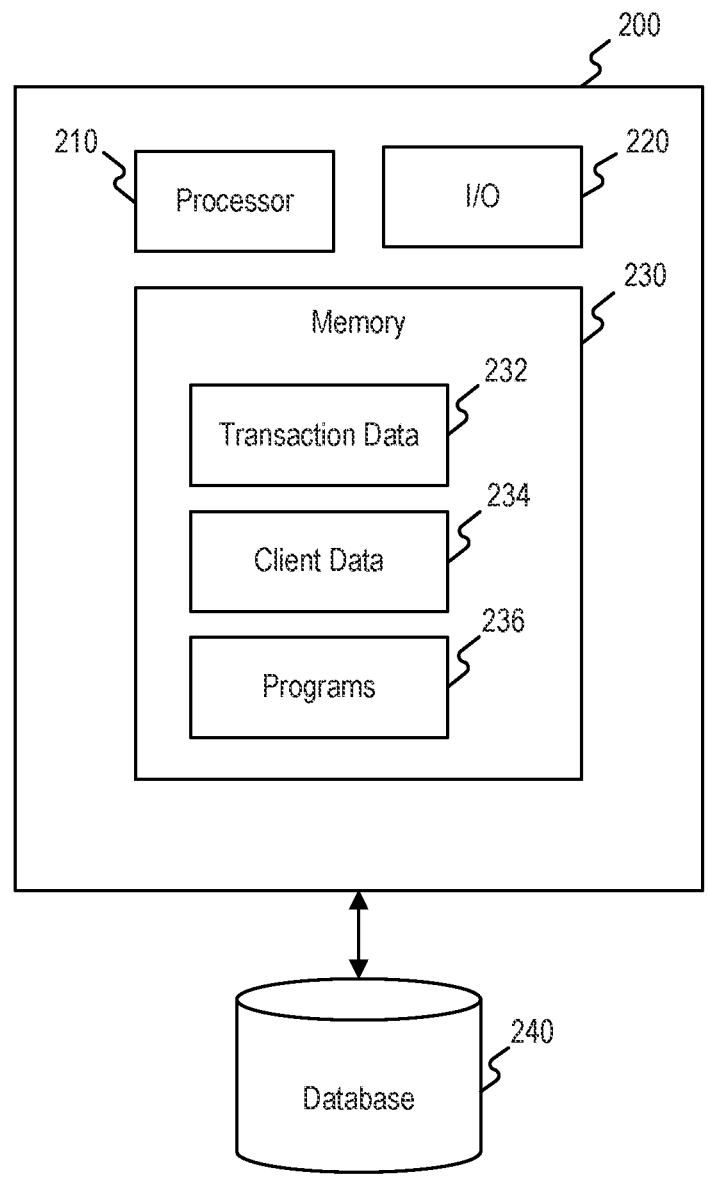
FIG. 2 is a diagram of an exemplary server system.

FIG. 2 is a block diagram of an exemplary computing system 200, consistent with the disclosed embodiments. In one embodiment, computing system 200 may include one or more of processor 210, one or more of memory 230, and one or more input/output (I/O) devices 220. In some embodiments, computing system 200 may take the form of a server, specially-programmed computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions executable by processor 210 to perform functions associated with the disclosed embodiments. For example, memory 230 may be configured with one or more software instructions, such as one or more program(s) 236 that perform particular functions when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, agent terminal 120, gateway 130, monolithic server 140, processing server 150, top-level database 160, and/or dashboard terminal 170 may, when implemented as computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to access database information including, but not limited to, storing information, retrieving database entries, updating entries in a database, and/or synchronizing information across multiple databases according to the disclosed embodiments.

Memory 230 may also store data that reflects any type of information in any format that the system may use to perform operations consistent with the disclosed embodiments. Memory 230 may store instructions to enable processor 210 to execute one or more applications, such as server applications, network communication processes, and any other type of application or software, including software directed to real-time processing of event-based streaming to a NoSQL database according to the disclosed embodiments. Alternatively, the instructions, application programs, etc., may be stored in an external storage (such as database 240) in communication with computing system 200 via network 110 or any other suitable network. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

Memory 230 may include transaction data 232. Transaction data 232 may include data about a given transaction. In some embodiments, transaction data 232 may include information about a unique development, such as information related to a particular application. For example, transaction data may include data about a given computer application (e.g., user preferences) or a loan (e.g., loan application information). Memory 230 may further or alternatively include client data 234. In some embodiments, client data may include data about a particular client. Client data 234 may include data about a recurring element, such as information about a recurring user or employee. For example, client data 234 may include data about a loan officer and applications that they are responsible for processing.

Processor 210, upon execution of one or more programs 236, may perform the functionality of the disclosed embodiments for enabling a user to continue temporary or restricted use of a payment method or account that has otherwise been declared unusable. In the disclosed embodiments, processor 210 may analyze received transaction data 232 in reference to one or more of the transaction rules and location information associated with client data 234 to perform the disclosed functionality.

I/O devices 220 may be one or more devices configured to allow data to be received and/or transmitted by computing system 200. I/O devices 220 may include one or more digital and/or analog communication devices that allow computing system 200 to communicate with other machines and devices, such as other components of system 100 shown in FIG. 1. Computing system 200 may also include interface components for one or more input devices, such as one or more keyboards, mouse devices, and the like, which may enable computing system 200 to receive input from an operator of one or more components of system 100 (not shown).

Computing system 200 may also contain one or more database(s) 240. Alternatively, computing system 200 may be communicatively connected to one or more database(s) 240. Computing system 200 may be communicatively connected to database(s) 240 through a direct connection and/or a network (e.g., network 110). Database 240 may include one or more memory devices that store information and are accessed and/or managed through computing system 200. Except as otherwise disclosed herein, as an example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

As discussed above, monolithic server 140 may include at least one computing system 200. Further, it should be understood that variations of computing system 200 may be implemented in other components of system 100, including agent terminal 120, gateway 130, processing server 150, top-level database 160, and/or dashboard terminal 170. Computing system 200 may be a single server or may be configured as a distributed computer system including multiple servers or computers that interoperate to perform one or more of the processes and functionalities associated with the disclosed embodiments.

Figure 3:
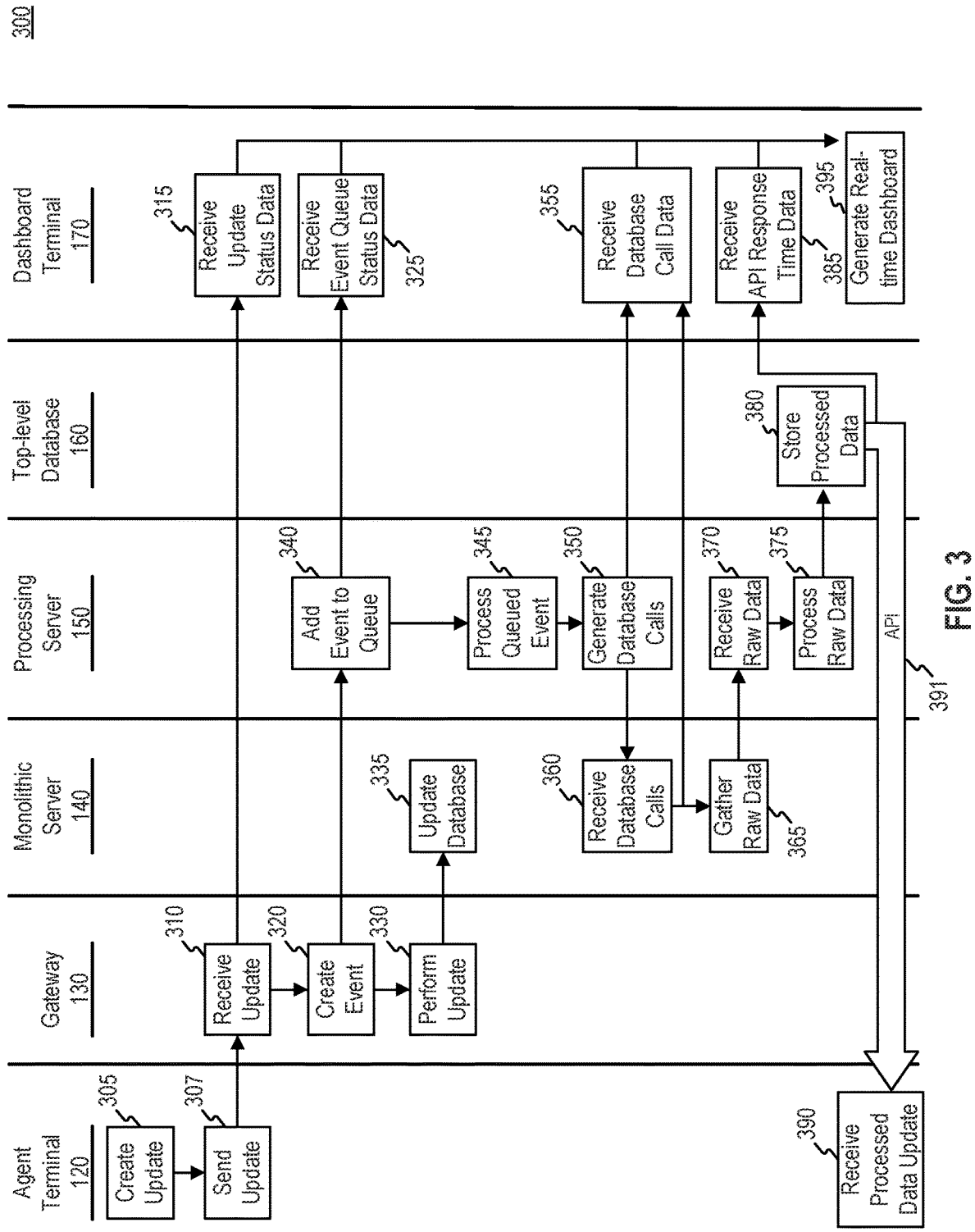
FIG. 3 is a process flow diagram of an exemplary process flow between a monolithic server system and a top-level database, consistent with disclosed embodiments.

FIG. 3 is a process flow diagram of an exemplary process 300 between a monolithic server system and a top-level database, consistent with disclosed embodiments. For example, process 300 may depict steps to allow updates to monolithic server 140 to be provided to top-level database 160 in real-time. In the following description, reference is made to certain components of FIG. 1 for purposes of illustration. For example, FIG. 3 may depict process 300 with method steps shown corresponding to one or more of agent terminal 120, gateway 130, monolithic server 140, processing server 150, top-level database 160, and dashboard terminal 170. It should be appreciated, however, that other implementations are possible and that components other than those illustrated above in FIG. 1.

In step 305, process 300 may create an update. Agent terminal 120 may receive input from a user or another computing device for an update in a centralized data repository. For example, agent terminal may receive a data entry from a user indicating that a name stored in a database of monolithic server 140 needs to be updated. Example updates may include a change to user preferences in a user's profile, correcting typographical information in one or more text field entries in a database, receiving new information to add to a data entry in a database, and the like. In the context of mortgage application processing, monolithic server 140 may store loan application data in a database, and agent terminal may create an update to the mortgage application information to add new information to the mortgage application. The updates from the mortgage application may be manual (e.g., a mortgage agent entering an update in a graphical user interface (GUI) to note that he contacted an applicant to confirm biographical information) or automatic (e.g., agent terminal 120 receiving an applicant's credit report via network 110 and adding the report result to a mortgage application in a database of monolithic server 140). In still other examples, a user may provide an update for the database. For example, a user may provide, via a financial institution's mobile application, a change to the loan amount for the mortgage based on a change in sale price of a house. Still other computing devices and mechanisms may be used to generate and transmit updates for a database of monolithic server 140.

The update may identify the database, data entry, and what information needs to be added or altered within the entry. For example, the update may provide a unique database identifier, a key for the tuple or row to which the update applies, and/or the change that needs to be made to the tuple or row. The update may further identify a particular attribute to edit or a new attribute to add to the tabular model of the database. In the context of a mortgage application, the update may identify a region for the financial institution that is handling the mortgage application to identify the particular database at issue, a unique mortgage application identifier corresponding to the row or tuple in the database, and the update to that tuple or row, such as an updated credit score to the credit score numerical attribute of the tuple or row.

In step 307, process 300 may send an update. Agent terminal 120 may send an update for a database of monolithic server 140 to gateway 130. In some embodiments, agent terminal 120 may transmit updates directly to gateway 130. For example, agent terminal 120 may include stored instructions to route update requests for monolithic server 140 to gateway 130. In some embodiments, agent terminal 120 may transmit the request to monolithic server 140, which in turn reroutes the request to gateway 130. In still further embodiments, gateway 130 is built on and serves as an interface to monolithic server 140. In this example, updates that transmitted directly to monolithic server 140 are received by gateway 130.

While step 305 and step 307 are shown being performed by agent terminal 120, database updates may originate from other computing devices. In some embodiments other networked computer terminals or servers (not shown in FIG. 1) may provide updates to a database of monolithic server 140. For example, in the context of the mortgage application, a computer terminal of a credit reporting agency may transmit an applicant's credit report directly to monolithic server 140. In still other examples, smartphones, mobile devices, Internet-of-Things (IoT) devices, and the like may provide database updates to monolithic server 140.

In step 310, process 300 may receive an update. Gateway 130 may receive the update generated and transmitted in step 305 and/or step 307. In step 320, process 300 may create an event. Gateway 130 may analyze the update and generate an event that provides a record of the change being made in the database by the update. The event may further include time information. For example, the time information may include a timestamp of when the update occurred or, in the event of parallel update processing and event generation, a time at which the event is expected to occur. In the context of a mortgage loan application database, the update may be to complete the current null entry in the credit score attribute of a given mortgage application created by applicant Jack O'Neil. In this example, the event may indicate that Jack O'Neil's mortgage application was updated to add a credit score of 711 on Jun. 11, 2018 at 11:45 UTC. While this example has been explained as a narrative description of the update and corresponding event, it is to be understood that the event and update may consist of computer-formatted syntax, such as a SQL command.

In step 330, process 300 may perform an update. Gateway 130 may implement the requested change in a database of monolithic server 140. For example, gateway 130 may transmit an instruction (e.g., a SQL command) to monolithic server 140 to implement the update. In step 335, process 300 may update a database. Monolithic server 140 may receive the update instruction from gateway 130 and make the requested change in its database(s). For example, monolithic server 140 may carry out the SQL command transmitted by gateway 130.

In step 340, process 300 may add an event to a queue. Processing server 150 may receive an event from gateway 130 and add it to a first-in-first-out queue to ensure that events are orderly processed. The queuing may ensure that events are not processed out of turn, ensuring that when process 300 proceeds to step 345 and step 350, the database of monolithic server 140 has been updated to reflect the change associated with the event.

In step 345, process 300 may process a queued event. Processing server 150 may retrieve the event from the queue and determine which data needs to be retrieved from monolithic server 140. In some embodiments, processing server 150 may identify the database and the tuple or row associated with the event when processing it. This may allow processing server 150 to generate database queries (e.g., step 350) to retrieve the entire row or tuple (or plural rows or tuples) associated with the update. For example, the update may have affected other attributes of a row in a relational database, processing server 150 may analyze the event to determine which a query or multiple queries need to be generated to stream data from a relational database to a cloud computing system. In some embodiments, processing server 150 may utilize event listeners to identify data affected by an update associated with an event.

In step 350, process 300 may generate one or more database calls. Processing server 150 may generate one or more calls to cause monolithic server 140 to stream relevant data from a relational database to a cloud computing system (e.g., processing server 150). For example, processing server may generate requests for tuples or rows affected by an update to the database associated with the processed event. In some embodiments, processing server 150 may generate and transmit concurrent calls to one or more databases of monolithic server 140 (e.g., one or more SQL databases).

In step 360, process 300 may receive database calls. Monolithic server 140 may receive the requests for database data from processing server 150. In some embodiments, monolithic server 140 may receive concurrent calls to an associated relational (e.g., SQL) database. In step 365, process 300 may gather raw data. Monolithic server 140 may retrieve data from one or more associated databases based on received database calls. In some embodiments, monolithic server 140 may stream database information responsive to database calls to a cloud computing environment (e.g., processing server 150).

In step 370, process 300 may receive raw data. Processing server 150 may receive a data stream from monolithic server 140 in response to database calls. Processing server 150 may place the streamed data into a queue for processing. In step 375, process 300 may process raw data, for example, using micro services. Processing server 150 may reorganize the data to allow the data to be compatible with a new type of database. For example, the data may be streamed from a first type of database (e.g., a relational database, a SQL database, and the like) associated with monolithic server 140. Processing server 150 may reorganize and/or reformat the data to be compatible with a server that is a different type than that from which the data was streamed. For example, processing server 150 may reformat the data to be compatible with a nonrelational database (e.g., a NoSQL database, an Apache Cassandra database, and the like).

In some embodiments, processing server 150 may process the data by manipulating the view of the data. Processing server 150 may receive tabular relational data keyed to a particular attribute in a tuple (or row) and reorient them to be aggregated based on a different attribute. For example, tabular relational data may be organized with tuples (or rows) for each user, where the tuples include attributes for multiple applications. In this example, processing server 150 may change the view to organize the data for each application, such as by including all user data relevant to a give application, rather than including attributes for multiple applications for an individual user. In another example, tabular data may include tuples (or rows) for loan applications, in this example, processing server 150 may reorient the data to be organized to a view based on a load officer responsible for processing the loan.

In some embodiments, processing server 150 may process the data by transforming the data format. Processing server 150 may receive relational data from a database of monolithic server 140 and transform it to be suitable for storage in a nonrelational database. For example, processing server 150 may receive tabular SQL data and transform it into a JavaScript Object Notation (JSON) format that is compatible with a nonrelational NoSQL database. In some embodiments, step 430 may include a step 436 of transforming the data format.

In step 380, process 300 may store raw data. Processing server 150 may store the processed data in top-level database 160. For example, once processed to be compatible with a nonrelational or NoSQL database, processing server may create entries in the nonrelational or NoSQL database to store the processed data. In step 391, process 300 may facilitate application programming interface (API) requests for the stored processed data. In some embodiments, once processing server 150 provides data updates to top-level database 160, API services for the updated data may be invoked by front-end applications, such as those operating on agent terminal 120. For example, process 300 may allow an API response time to provide current data from top-level database 160 to front end applications (e.g., agent terminal 120) in less than 100 milliseconds. This may provide a marked improvement over response time to access data in a relational database of monolithic server 140 directly, for example, using a batch update process.

In step 390, process 300 may receive an update with processed data. By consuming an API, front-end applications may receive current database updates from top-level database. For example, applications running on agent terminal 120 may receive updated information. In the context of a mortgage application database, a loan officer application may receive updates regarding the loans he or she is responsible for processing with reduced latency as the updates occur (e.g., as opposed to a batch process). The more consistent updates may allow the loan officer to be more timely made aware of necessary action items he or she may need to take to facilitate the processing of a given mortgage application, such as calling an applicant, reviewing a credit report, and the like.

In some embodiments, process 300 may include status monitoring steps. A computer terminal may proactively monitor or receive updates to determine the status of processing during one or more steps of process 300. For example, dashboard terminal 170 may receive update status data in step 315 to monitor database updates (e.g., in step 310). In further examples, dash board terminal 170 may receive event queue status data in step 325 to monitor the status of one or more event queues (e.g, the processing in step 340 and/or step 345); may receive database call data in step 355 to monitor the generation and processing of database calls in system 100 (e.g., from step 350, step 360, step 365, and/or step 370); and/or may receive API response time data in step 385 (e.g., monitoring the responsiveness of an API in step 391 and/or the processing in step 390). While FIG. 3 depict dashboard terminal 170 receive status information and/or updates from certain steps of process 300, these particular updates are merely exemplary. In certain embodiments, dashboard terminal 170 may receive updates regarding or monitor the status of additional steps of process 300.

In some embodiments, microservices may facilitate aggregating status data from data processing functions. For example, rather than individual components of system 100 reporting status information directly to dashboard terminal 170 (as shown in FIG. 3), microservices operating on one or more servers may aggregate status information from the respective components of system 100. A second set of microservices may add the aggregated status data to a database for display and further processing.

In step 385 process 300 may generate a real-time dashboard. Dashboard terminal 170 may generate a graphical representation of the received status information, such as the information received in step 605, step 610, step 615, and/or step 620 of FIG. 6 (described below). For example, dashboard terminal 170 may generate a series of gauges to show a digital "dashboard" of resource demand and/or processing time of system 100 based on received data. In another example, dashboard terminal 170 may generate a time-dependent line graph plotting received data over time. In this example, each line of time-wise data may be shown in relation to a predefined limit, which may indicate a desired target for the statistic or a threshold at which system performance may fail. Dashboard terminal 170 may generate additional data display user interfaces consistent with disclose embodiments.

While FIG. 3 depicts process 300 with steps in a particular order, in some embodiments process 300 may omit certain steps or perform them in a different order than depicted. For example, in some embodiments, queuing (e.g., step 340) may be omitted. In other examples, process 300 may generate database calls (e.g., step 350) concurrently while receiving raw data (e.g., step 370). Other embodiments may present the steps in other orders consistent with this disclosure.

Figure 4:
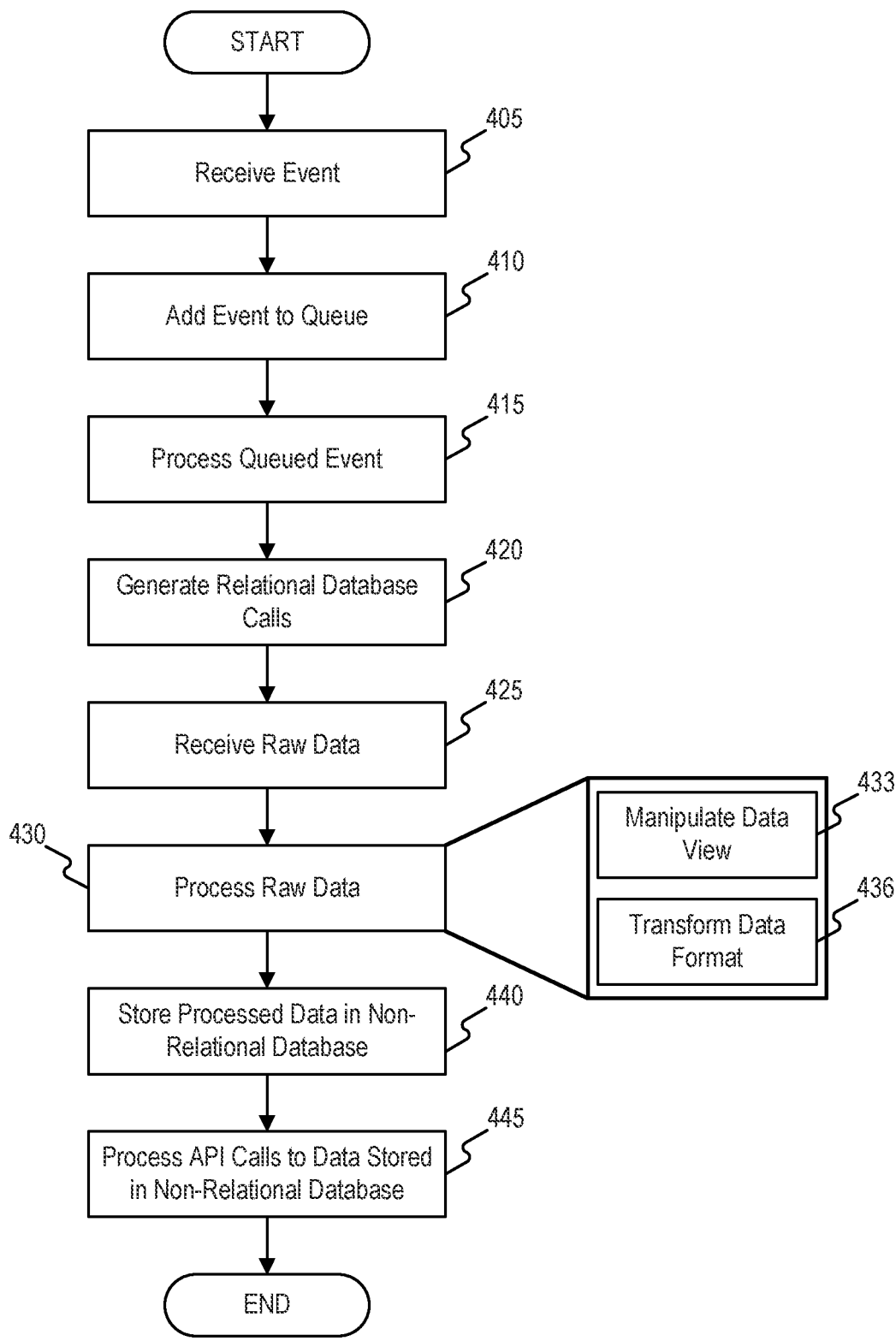
FIG. 4 is a flowchart of an exemplary process for real-time processing of event-based streaming with NoSQL databases, consistent with disclosed embodiments

FIG. 4 is a flowchart of an exemplary process for real-time processing of event-based streaming with NoSQL databases, consistent with disclosed embodiments. In the following description, reference is made to certain components of FIG. 1 for purposes of illustration. For example, FIG. 4 may depict process 400 with method steps shown corresponding to one or more of agent terminal 120, gateway 130, monolithic server 140, processing server 150, top-level database 160, and dashboard terminal 170. It should be appreciated, however, that other implementations are possible and that components other than those illustrated above in FIG. 4.

In step 405, process 400 may receive an event. Processing server 150 may receive one or more events from gateway 130. For example, system 100 may receive an event detailing a change made to a database as described in step 320 and/or step 340 of process 300.

In step 410, process 400 may add an event to a queue. Processing server 150 may add a received event to a queue of events for processing. For example, system 100 may queue one or more events detailing changes made to a database as described in step 340 of process 300. In step 415, process 400 may process a queued event. Processing server 150 may retrieve an event from a queue and analyze it to determine what actions need to occur in relation to the event. For example, system 100 may process one or more queued events as described in step 345 of process 300.

While process 400 depicts steps to queue events prior to processing them in some embodiments, process 400 may process events in real-time without queuing. For example, in certain embodiments, the computing devices used to implement process 400 may have sufficient resources to process events as they are received in step 405. Processing server 150 may include parallel processing capabilities or external buffering so that it does not need to queue events itself.

In step 420, process 400 may generate relational database calls, Processing server 150 may generate a plurality of concurrent calls to monolithic server 140 to retrieve data associated with the processed event from the queue. For example, system 100 may generate database calls as described in step 350 of process 300. In step 425, process 400 may receive raw data. Processing server 150 may receive raw data from monolithic server 140 in response to the database calls generated and sent in step 420. For example, system 100 may receive a data as discussed in step 370 of process 300.

In step 430, process 400 may process raw data. Processing server 150 may analyze and manipulate the received raw data from step 425 to make it suitable for storing another storage mechanism. For example, system 100 may process data as described in step 375 of process 300. In some embodiments, step 430 may include a step 433 of manipulating the view of the data. Processing server may receive tabular relational data keyed to a particular attribute in a tuple (or row) and reorient them to be aggregated based on a different attribute. For example, tabular relational data may be organized with tuples (or rows) for each user, where the tuples include attributes for multiple applications. In this example, processing server 150 may change the view to organize the data for each application, such as by including all user data relevant to a give application, rather than including attributes for multiple applications for an individual user. In another example, tabular data may include tuples (or rows) for loan applications. In this example, processing server 150 may reorient the data to be organized to a view based on a load officer responsible for processing the loan.

In some embodiments, step 430 may include a step 436 of transforming the data format. Processing server 150 may receive relational data from monolithic server 140 and transform it to be suitable for storage in a nonrelational database. For example, processing server 150 may receive tabular SQL data and transform it into a JavaScript Object Notation (JSON) format that is compatible with a nonrelational NoSQL database. In some embodiments, step 430 may include a step 436 of transforming the data format.

In step 440, process 400 may store raw data in a nonrelational database. Processing server 150 may store the processed data in top-level database 160 (e.g., a NoSQL database). For example, system 100 may store processed data in a nonrelational database as discussed in step 375 and step 380 of process 300. In step 445, process 400 may process API calls for data stored in a nonrelational database. Processing server 150 may facilitate calls to an API that request information from top-level database 160 (e.g., a NoSQL database). For example, system 100 may respond to API requests as discussed in step 391 of process 300.

While FIG. 4 depicts process 400 with steps in a particular order, in some embodiments process 400 may omit certain steps or perform them in a different order than depicted. For example, in some embodiments, queuing (e.g., step 410) may be omitted. In other examples, process 400 may generate database calls (e.g., step 420) concurrently while receiving raw data (e.g., step 425). Other embodiments may present the steps in other orders consistent with this disclosure.

Figure 5:
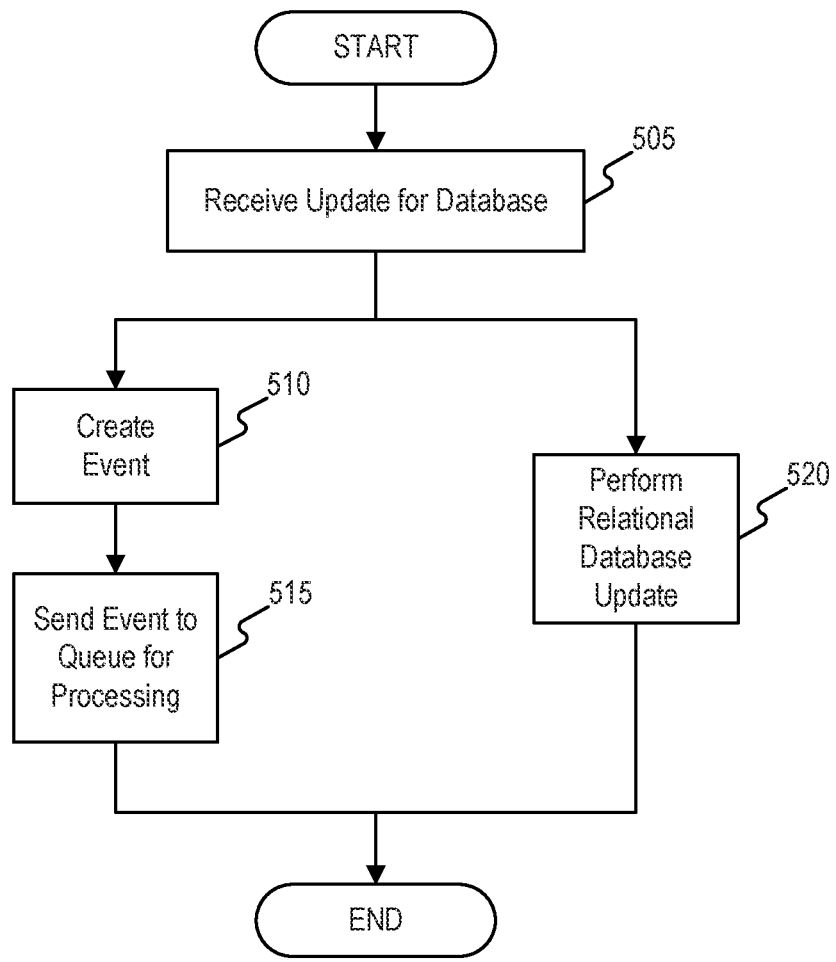
FIG. 5 is a flowchart of an exemplary process for real-time processing of database updates, consistent with disclosed embodiments.

FIG. 5 is a flowchart of an exemplary process 500 for real-time processing of database updates, consistent with disclosed embodiments. In the following description, reference is made to certain components of FIG. 1 for purposes of illustration. For example, FIG. 5 may depict process 500 with method steps shown corresponding to one or more of agent terminal 120, gateway 130, monolithic server 140, processing server 150, top-level database 160, and dashboard terminal 170. It should be appreciated, however, that other implementations are possible and that components other than those illustrated above in FIG. 5.

In step 505, process 500 may receive an update for a database. Gateway 130 may receive an update for monolithic server 140 from a computing device (e.g., agent terminal 120). For example, system 100 may receive an update for a relational database as described in step 310 of process 300.

In step 510, process 500 may create an event. Gateway 130 may create one or more events describing the update received in step 505. For example, system 100 may create events as described in step 320 of process 300. In step 515, process 500 may send one or more events to a queue for processing. Gateway 130 may send one or more events generated in step 510 to a queue in processing server 150. For example, system 100 may add events to queues as described in step 320 and step 340 of process 300.

In step 520, process 500 may perform an update in a relational database. Gateway 130 may update a database of monolithic server 140 (e.g., a SQL database) based on the update request received in step 505. For example, system 100 may update a relational database as described in step 330 and/or step 335 of process 300.

As shown by the parallel paths in FIG. 5, process 500 may simultaneously compute and persist data. In some embodiments, after receiving an update (e.g., step 505), process 500 may perform event creation steps (e.g., step 510 and/or step 515) while simultaneously updating a database (e.g., step 520).

While FIG. 5 depicts process 500 with steps in a particular order, in some embodiments process 500 may omit certain steps or perform them in a different order than depicted. For example, in some embodiments, while FIG. 5. includes parallel processing paths, process 500 may perform a relational database update (e.g., step 520) before or after creating an event (e.g., step 510) and/or sending an event to a queue (e.g., step 515). Other embodiments may present the steps in other orders consistent with this disclosure.

Figure 6:
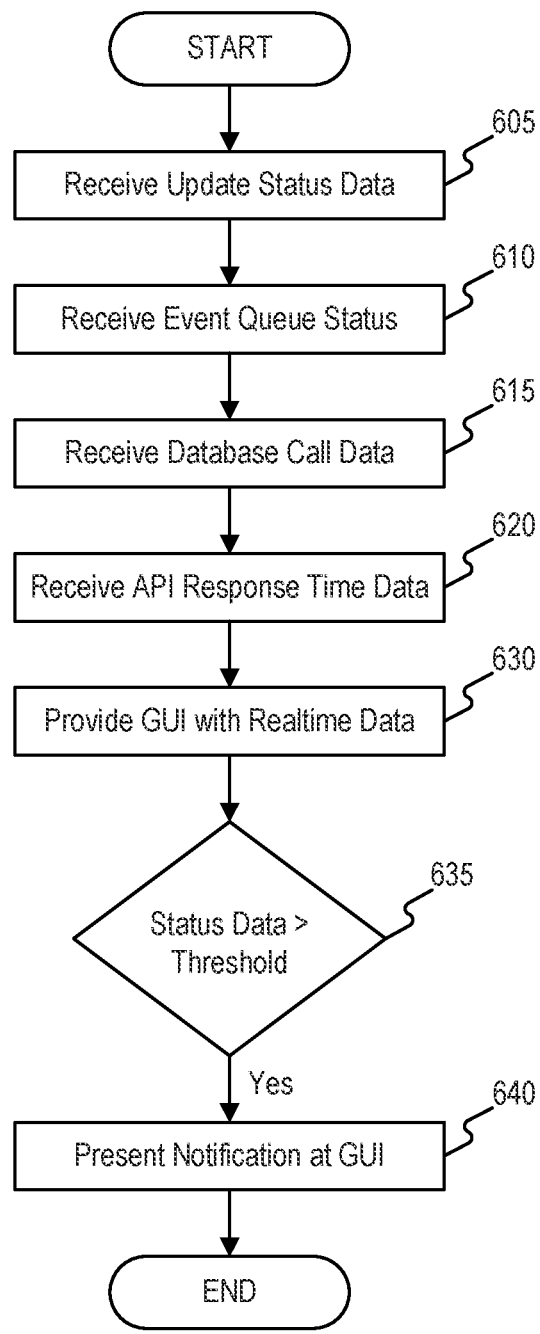
FIG. 6 is a flowchart of an exemplary process for determining the status of database systems, consistent with disclosed embodiments.

FIG. 6 is a flowchart of an exemplary process 600 for determining the status of database systems, consistent with disclosed embodiments. In the following description, reference is made to certain components of FIG. 1 for purposes of illustration. For example, FIG. 6 may depict process 600 with method steps shown corresponding to one or more of agent terminal 120, gateway 130, monolithic server 140, processing server 150, top-level database 160, and dashboard terminal 170. It should be appreciated, however, that other implementations are possible and that components other than those illustrated above in FIG. 6.

In step 605, process 600 may receive update status data. Dashboard terminal 170 may receive status information describing the quantity, size, and/or frequency of relational database updates received by gateway 130. For example, system 100 may receive status data regarding relational database updates as described in step 315 of process 300.

In step 610, process 600 may receive event queue status data. Dashboard terminal 170 may receive data describing the status of one or more event queues of processing server 150, such as the number of queued events, the turnover rate of the queue, and/or the rate of change of the queue length. For example, system 100 may receive event queue status data as described in step 325 of process 300.

In step 615, process 600 may receive database call data. Dashboard terminal 170 may receive data regarding the relational database call generation and processing, such as the volume of calls, processing response time, and/or load on the relational data. For example, system 100 may receive database call status data as described in step 355 of process 300.

In step 620, process 600 may receive API response time data. Dashboard terminal 170 may receive real-time information about the time at which API calls are processed (e.g., by processing server 150), such as the time between sending and receiving a response to an API request, the processing load on the nonrelational database (e.g., top-level database 160). For example, system 100 may receive API response time data as described in step 385 of process 300.

In step 630, process 600 may provide a graphical user interface (GUI) with real-time data. Dashboard terminal 170 may generate a graphical representation of the received status information, such as the information received in step 605, step 610, step 615, and/or step 620. For example, dashboard terminal 170 may generate a series of gauges to show a digital "dashboard" of resource demand and/or processing the of system 100 based on received data. In another example, dashboard terminal 170 may generate a time-dependent line graph plotting received data over time. In this example, each line of time-wise data may be shown in relation to a predefined limit, which may indicate a desired target for the statistic or a threshold at which system performance may fail. Dashboard terminal 170 may generate additional data display user interfaces consistent with disclose embodiments.

In step 635, process 600 may determine whether status data exceeds thresholds. Dashboard terminal may compare the received status data to one or more corresponding thresholds. The threshold may be preset by an administrator or determined by system 100 based on an operational state needed limit needed to run properly. For example, each type of status data may be associated with one or more predefined thresholds, and when the received data falls above (or below as the case may be) its corresponding threshold, dashboard terminal 170 may proceed with generating an alert. In some embodiments each threshold may have its own defined alert mechanism. For example, when a queue length (e.g., the queue in step 340) exceeds a predefined limit a GUI notification may appear highlighting the queue in a system diagram on the GUI with a notation indicating the number of pending event requests in the queue. However, a threshold for API response time may indicate that when the response time exceeds a predefined number of milliseconds, an SMS text message and/or an email is sent to one or more administrators of system 100.

In some embodiments, multiple thresholds may be applied to a given status data value. For example, high and low thresholds may be applied simultaneously (e.g., a notch filter). In this example, dashboard terminal 170 may allocate additional resources to a component of system 100 when a high threshold is exceeded. And, dashboard terminal 170 may simultaneously monitor the data for falling below a low threshold, below which excess processing resources of system 100 are made available for other processes. As an example context, dashboard terminal may apply a low threshold of 1 millisecond and a high threshold of 20 milliseconds for event queue wait time. When the event queue status information indicates a current wait time of less than 1 millisecond, system 100 may control resources so that certain processing resources allocated for processing the event queue may be utilized by other processes, such as processing API requests for example. When the event queue status information indicates a current wait time of more than 20 milliseconds, system 100 may control resources to allocate additional resources to processing queued events so to lower the queue wait time.

As another example of multiple thresholds, two high or two low thresholds may be applied simultaneously. In this example, a lower high threshold may be used to automatically allocate additional resources to a given component of system 100, while an upper high threshold may trigger an alarm (e.g., send an email or text message to a system administrator). This arrangement may allow the system to advantageously function autonomously while involving system administrators in rare edge cases or catastrophic situations. Additional example implementations may use three or more thresholds in combination. For example, dashboard terminal may apply a lower low threshold, an upper low threshold, a lower high threshold, and/or an upper high threshold. In this example each of the thresholds may have an increasing value. That is, the upper high threshold may be greater than the lower high threshold, which may be greater than the upper low threshold, with the lower low threshold being the lowest threshold.

Although not shown in FIG. 6, when status data does not meet one or more thresholds (e.g., step 635, "no," not shown), process 600 may do nothing. In some embodiments, instead of doing nothing, process 600 may display an "all clear" status message. For example, dashboard terminal 170 may depict a green background when status data does not meet any threshold limits.

When status data exceeds thresholds (e.g., step 635, "yes"), process 600 may proceed to step 640. In step 640, process 600 may present a notification at a GUI. When a given status datapoint exceeds a corresponding threshold, dashboard terminal 170 may generate an alter in a GUI to alert an administrator. For example, dashboard terminal 170 may generate a pop-up window in the GUI listing the current status data, the threshold that failed to be met, and a relevant additional description.

In addition to graphical alerts within a UI, in some embodiments, dashboard terminal may trigger audible alerts or remote alerts. For example, dashboard terminal 170 may cause a beep pattern to be generated by speakers connected to dashboard terminal 170 or may transmit a short message service (SMS) text message to the phone numbers of one or more administrators for system 100. In still further examples, thresholds may trigger automatic control action in system 100. For example, when relational database calls are being processed (e.g., in step 360 and step 365) at a rate that is below a predefined response rate, system 100 may invoke additional computing resources to provide additional processing power to responding to raw data queries.

While FIG. 6 depicts process 600 with steps in a particular order, in some embodiments process 600 may omit certain steps or perform them in a different order than depicted. For example, in some embodiments, process 600 present a notification at a GUI (e.g., step 640) once any given received information satisfies step 635, rather than waiting to receive all data in step 605 through step 630 before making such a comparison. As another example, process 600 may omit receiving particular types of status data (e.g., one or more of step 605, step 610, step 615, and step 620) and/or receive additional status information (not shown) such as the status of performing updates to a relational database (e.g., step 330 and/or step 335 of process 300). Other embodiments may present the steps in other orders consistent with this disclosure.

Figure 7:
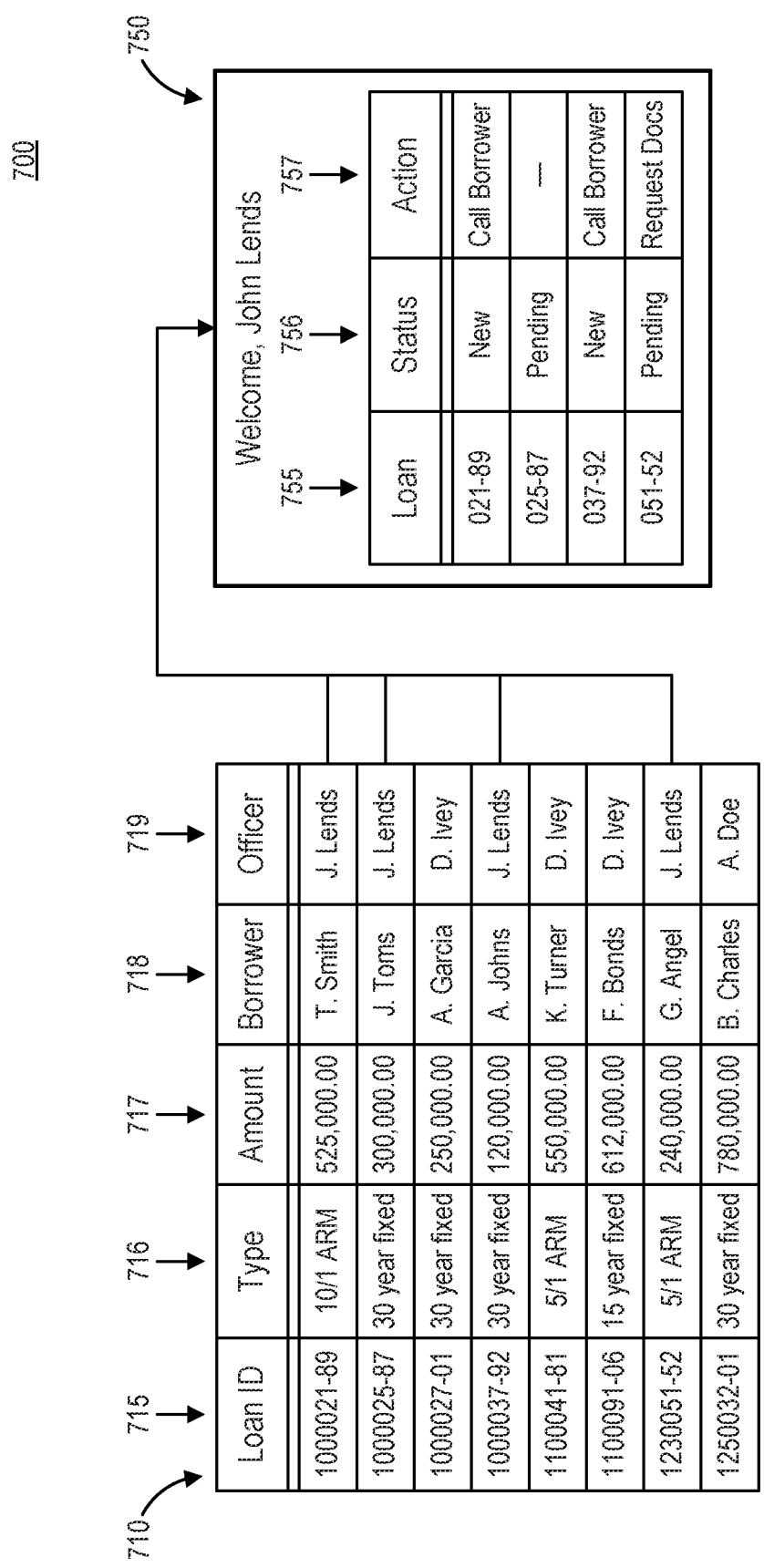
FIG. 7 is a diagram of an example data view transformation, consistent with disclose embodiments.

FIG. 7 is a diagram of an example data flow 700 of a data view transformation, consistent with disclose embodiments. Data flow 700 may serve as an example of the raw data processing performed by processing server 150 and/or in disclosed processes (e.g., in step 375 of process 300 in step 430 of process 400). As shown in FIG. 7, data from a relational database (e.g., a SQL database) may be used to change its "view" from being itemized based on individual loan applications to a view of a loan officer. Data flow 700 may include relational database 710. As an example, relational database 710 may include records made up of rows or tuples for each attribute, including loan ID attribute 715, loan type attribute 716, loan amount attribute 717, borrower name attribute 718, and/or officer name attribute 719.

Data flow 700 may include interface 750. In some embodiments, interface 750 may display some or all of the data from relational database 710 reoriented into a few of a particular application. In the example shown in FIG. 7, interface 750 provides a view oriented to an individual loan officer. While still shown in a tabular format, the data may be retrieved from a nonrelational database, such as a NoSQL databased (e.g., an Apache Cassandra database), for example. The fields shown in interface 750 may be retrieved through APIs to top-level database 160 (e.g., a nonrelational database). By retrieving data through an API to a nonrelational database interface 750 may provide updated information in the depicted fields, such as loan identifier field 755, loan status field 756, and/or action item field 757. Because certain actions may be time-sensitive, disclosed embodiments may advantageously improve the time needed for the interface to update action item field 757 for a given loan, for example, based on an update to an associate relational database entry.

Although data flow 700 depicts a particular example flow from a financial application of disclosed embodiments, this disclosure may be applied beyond financial examples. For example, disclosed embodiments may improve database update responsiveness in general database management systems, networked applications, document management services, healthcare applications, and the like.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software reactions or modules may be integrated into a computer system, non-transitory computer-readable media, or existing communications software.

In this description, the conjunction "and/or" may mean each of the listed items individual, a combination of the listed items, or both. Moreover, the "and/or" conjunction as used in this specification may include all combinations, sub-combinations, and permutations of listed items. For example, the phrase "A, B, and/or C" may mean each of A, B, and C individually, as well as A, B, and C together in addition to sub-groups A and B, A and C, and B and C. Unless specified otherwise, this example use of "and/or" may also intend to include all potential orders of items in each group and sub-group, such as B-C-A, B-A-C, C-A-B, C-B-A, and A-C-B, along with the subgroups C-B, B-A, and C-A.

Moreover, while illustrative embodiments have been described herein, the scope includes any and all embodiments having equivalent elements, modifications, omissions, combinations (e.g., aspects across various embodiments), adaptations, or alterations based on the present disclosure. The elements in the claims are to be interpreted broadly based on the language employed in the claims and not limited to examples described in the present specification or during the prosecution of the application, of which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A system for retrieving data from a database comprising:
   one or more databases;
   one or more memory devices storing instructions; and
   one or more processors coupled to the one or more memory devices and at least one database of the one or more databases, the one or more processors being configured to execute the instructions to perform operations comprising:
      collecting aggregated data in a data structure by aggregating update data, event queue data, and database call data from the at least one database;
      receiving an API response time from an API configured to provide event data from the at least one database, the API response time comprising real-time information about a time at which at least one API call is processed;
      comparing the API response time with a first threshold and the aggregated data with a second threshold; and
      in response to determining that the API response time exceeds the first threshold or that the aggregated data exceeds the second threshold, generating a notification to a dashboard system.

2. The system of claim 1, wherein the API response time provides response data from a top-level of the one or more databases to front end applications.

3. The system of claim 1, wherein the first threshold is 100 milliseconds or less.

4. The system of claim 1, wherein the notification comprises a pop-up window listing current status data, an indication that the API response time exceeds the first threshold or an indication that the aggregated data exceeds the second threshold, and a description.

5. The system of claim 1, wherein the notification triggers at least one of an audible alert or a text message to phone numbers for administrators.

6. The system of claim 1, wherein the operations further comprise, in response to determining that the API response time exceeds the first threshold, invoking additional computer resources.

7. The system of claim 1, wherein the data structure comprises a plurality of microservices, the plurality of microservices comprising a first microservice set and a second microservice set, the first microservice set being configured to aggregate the update data, the event queue data, and the database call data, the second microservice set being configured to display and process the aggregated data.

8. The system of claim 1, wherein:
   the one or more databases comprise a relational database; and
   the aggregated data describes at least one of a quantity, size, or frequency of relational database updates received by a gateway.

9. The system of claim 1, wherein the event queue data describes at least one of a number of queued events, a turn over rate, or a rate of change of queue length.

10. The system of claim 1, wherein the database call data describes at least one of volume of calls, processing response time, or load on the at least one database.

11. A method for retrieving data from a database comprising:
   collecting aggregated data in a data structure by aggregating update data, event queue data, and database call data from at least one database;
   receiving an API response time from an API configured to provide event data from the at least one database, the API response time comprising real-time information about a time at which at least one API call is processed;
   comparing the API response time with a first threshold and the aggregated data with a second threshold; and
   in response to determining that the API response time exceeds the first threshold or that the aggregated data exceeds the second threshold, generating a notification to a dashboard system.

12. The method of claim 11, wherein the API response time provides response data from a top-level of the at least one database to front end applications.

13. The method of claim 11, wherein the first threshold is 100 milliseconds or less.

14. The method of claim 11, wherein the notification comprises a pop-up window listing current status data, an indication that the API response time exceeds the first threshold or an indication that the aggregated data exceeds the second threshold, and a description.

15. The method of claim 11, wherein the notification triggers at least one of an audible alert or a text message to phone numbers for administrators.

16. The method of claim 11, further comprising, in response to determining that the API response time exceeds the first threshold, invoking additional computer resources.

17. The method of claim 11, wherein the data structure comprises a plurality of microservices, the plurality of microservices comprising a first microservice set and a second microservice set, the first microservice set being configured to aggregate the update data, the event queue data, and the database call data, the second microservice set being configured to display and process the aggregated data.

18. The method of claim 11, wherein:
   the at least one database comprises a relational database; and
   the aggregated data describes at least one of quantity, size, or frequency of relational database updates received by a gateway.

19. The method of claim 18, wherein:
   the event queue data describes at least one of a number of queued events, a turnover rate, or a rate of change of queue length; and
   the database call data describes at least one of volume of calls, processing response time, or load on the at least one database.

20. A non-transitory computer readable media storing instructions that, when executed by one or more processors, cause operations comprising:
   collecting aggregated data in a data structure by aggregating update data, event queue data, and database call data from at least one database;
   receiving an API response time from an API configured to provide event data from the at least one database, the API response time comprising real-time information about a time at which at least one API calls is processed;
   comparing the API response time with a first threshold and the aggregated data with a second threshold; and
   in response to determining that the API response time exceeds the first threshold or that the aggregated data exceeds the second threshold, generating a notification.

* * * * *